United States Patent
Tirumala et al.

(10) Patent No.: US 10,977,037 B2
(45) Date of Patent: Apr. 13, 2021

(54) TECHNIQUES FOR COMPREHENSIVELY SYNCHRONIZING EXECUTION THREADS

(71) Applicant: NVIDIA Corporation, Santa Clara, CA (US)

(72) Inventors: Ajay Sudarshan Tirumala, Cupertino, CA (US); Olivier Giroux, Santa Clara, CA (US); Peter Nelson, San Francisco, CA (US); Jack Choquette, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 7 days.

(21) Appl. No.: 16/595,398

(22) Filed: Oct. 7, 2019

(65) Prior Publication Data
US 2020/0034143 A1 Jan. 30, 2020

Related U.S. Application Data

(63) Continuation of application No. 15/499,843, filed on Apr. 27, 2017, now Pat. No. 10,437,593.

(51) Int. Cl.
*G06F 9/30* (2018.01)
*G06F 9/38* (2018.01)
*G06F 9/46* (2006.01)

(52) U.S. Cl.
CPC ........ *G06F 9/3009* (2013.01); *G06F 9/30087* (2013.01); *G06F 9/3851* (2013.01); *G06F 9/46* (2013.01)

(58) Field of Classification Search
None
See application file for complete search history.

(56) References Cited

U.S. PATENT DOCUMENTS

| | | | |
|---|---|---|---|
| 6,175,930 B1 * | 1/2001 | Arimilli | G06F 12/0831 709/248 |
| 7,500,087 B2 * | 3/2009 | Saha | G06F 9/3004 712/235 |
| 8,200,947 B1 | 6/2012 | Nickolls et al. | |
| 8,301,870 B2 * | 10/2012 | Kailas | G06F 9/3851 712/227 |
| 9,513,905 B2 * | 12/2016 | Smelyanskiy | G06F 9/3004 |

(Continued)

*Primary Examiner* — Eric Coleman
(74) *Attorney, Agent, or Firm* — Artegis Law Group, LLP

(57) ABSTRACT

In one embodiment, a synchronization instruction causes a processor to ensure that specified threads included within a warp concurrently execute a single subsequent instruction. The specified threads include at least a first thread and a second thread. In operation, the first thread arrives at the synchronization instruction. The processor determines that the second thread has not yet arrived at the synchronization instruction and configures the first thread to stop executing instructions. After issuing at least one instruction for the second thread, the processor determines that all the specified threads have arrived at the synchronization instruction. The processor then causes all the specified threads to execute the subsequent instruction. Advantageously, unlike conventional approaches to synchronizing threads, the synchronization instruction enables the processor to reliably and properly execute code that includes complex control flows and/or instructions that presuppose that threads are converged.

20 Claims, 6 Drawing Sheets

(56) References Cited

U.S. PATENT DOCUMENTS

| | | | |
|---|---|---|---|
| 2008/0184211 A1* | 7/2008 | Nickolls | G06F 8/456 717/140 |
| 2009/0240931 A1 | 9/2009 | Coon et al. | |
| 2011/0078417 A1* | 3/2011 | Fahs | G06F 9/30087 712/216 |
| 2011/0219221 A1 | 9/2011 | Skadron et al. | |
| 2013/0117541 A1 | 5/2013 | Choquette et al. | |
| 2014/0149719 A1 | 5/2014 | Tabaru | |
| 2014/0281429 A1* | 9/2014 | Brown | G06F 9/30087 712/226 |
| 2014/0365752 A1 | 12/2014 | Howes et al. | |
| 2015/0026438 A1 | 1/2015 | Giroux et al. | |

* cited by examiner

TECHNIQUES FOR COMPREHENSIVELY SYNCHRONIZING EXECUTION THREADS

CROSS-REFERENCE TO RELATED APPLICATIONS

This application is a continuation of the U.S. patent application titled, "TECHNIQUES FOR COMPREHENSIVELY SYNCHRONIZING EXECUTION THREADS," filed on Apr. 27, 2017 and having Ser. No. 15/499,843. The subject matter of this related application is hereby incorporated herein by reference.

BACKGROUND OF THE INVENTION

Field of the Invention

Embodiments of the present invention relate generally to parallel processing systems and, more specifically, to techniques for comprehensively synchronizing execution threads.

Description of the Related Art

Graphics processing units (GPUs) are capable of very high performance using a relatively large number of small, parallel execution threads on dedicated programmable hardware processing units. In GPUs, a "thread group" or "warp" refers to a group of threads that, in general, concurrently execute the same instructions on different input data. However, developers may write code that, when executing on the GPU, causes only a portion of the threads in the warp to execute an instruction. The threads in the warp are referred to as "diverged" during the execution of this type of instruction. An example of code that causes such a divergence is code written in the C programming language that includes an "if" statement that results in two or more sequences of instructions, where a different set of threads in a warp follows each of the sequences.

One limitation of GPUs is that the proper behavior of some instructions presupposes that the threads in each warp are converged. For example, a GPU may implement a shuffle instruction that allows direct register-to-register data exchange between threads in a warp. If a GPU attempts to execute a shuffle instruction on a warp when the threads are diverged, then the results are unpredictable. For instance, the code that is executing on the GPU may produce incorrect results or terminate unexpectedly.

Although some compilers and GPUs implement some level of synchronization functionality, that functionality is limited and does not guarantee convergence for all situations. For example, many GPUs implement a barrier instruction that is intended to synchronize warps. However, the barrier instruction presupposes that the threads in each of the warps have converged and, consequently, is unreliable. In another example, some compilers analyze the code to detect relatively simple divergence patterns. Upon detecting a divergence pattern, the compilers bracket the divergent instructions between two instructions that, respectively, indicate a re-convergence point and continue execution at the re-convergence point. However, the compilers are unable to analyze certain types of complicated control flows and, consequently, the compilers are not always able to ensure that threads within a warp are converged when required for proper execution of the code.

As a general matter, the implementation of certain program instructions may require a level of convergence across the different threads in a warp that cannot be maintained by the compiler and hardware mechanisms included in the GPU that are normally tasked with ensuring such thread convergence. Accordingly, the only way to ensure proper execution of code is for the programmer to write code in programming languages that do not support complex control flows or write code only using limited subsets of instruction and operations defined in richer programming languages. Restricting code in either of these ways would dramatically reduce the ability of programmers to efficiently configure GPUs, which is undesirable.

As the foregoing illustrates, what is needed in the art are more effective techniques for synchronizing execution threads within a thread group or warp.

SUMMARY OF THE PRESENT INVENTION

One embodiment of the present invention sets forth a computer-implemented method for synchronizing a plurality of threads included within a warp to concurrently execute a single subsequent instruction. The method includes determining that a first thread included in the plurality of threads has arrived at a synchronization instruction that specifies the plurality of threads; determining that a second thread included in the plurality of threads has not yet arrived at the synchronization instruction; configuring the first thread to stop executing instructions; issuing at least one instruction for the second thread; determining that all the threads included in the plurality of threads have arrived at the synchronization instruction; and causing all the threads included in the plurality of threads to execute the single subsequent instruction.

One advantage of the disclosed techniques is that the techniques enable processors to reliably and properly execute code and instructions that rely on the convergence of different threads included within a warp. By contrast, conventional hardware mechanisms included in conventional processors are not always able to ensure that threads within a warp are converged when required for proper execution of code and instructions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
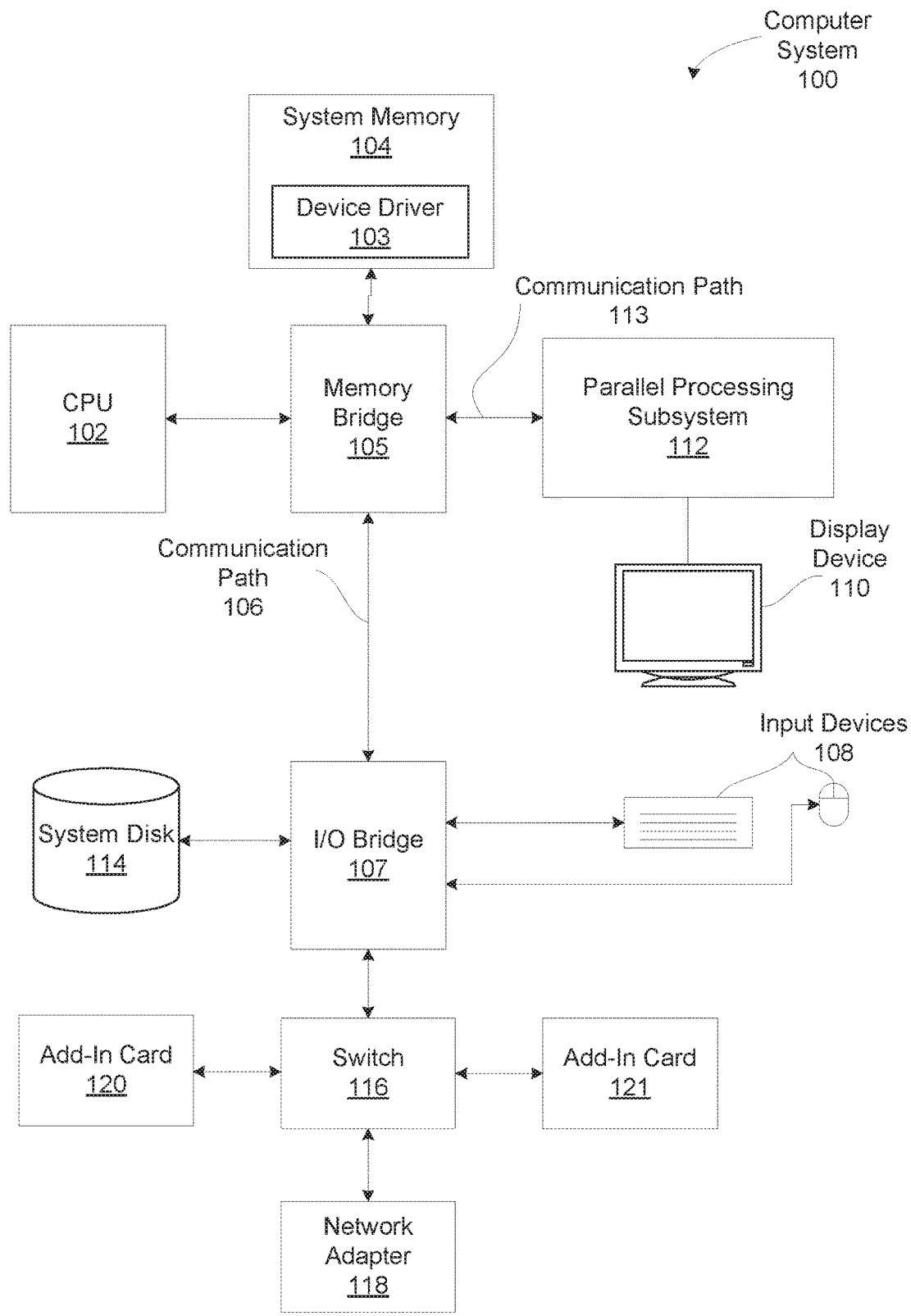
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
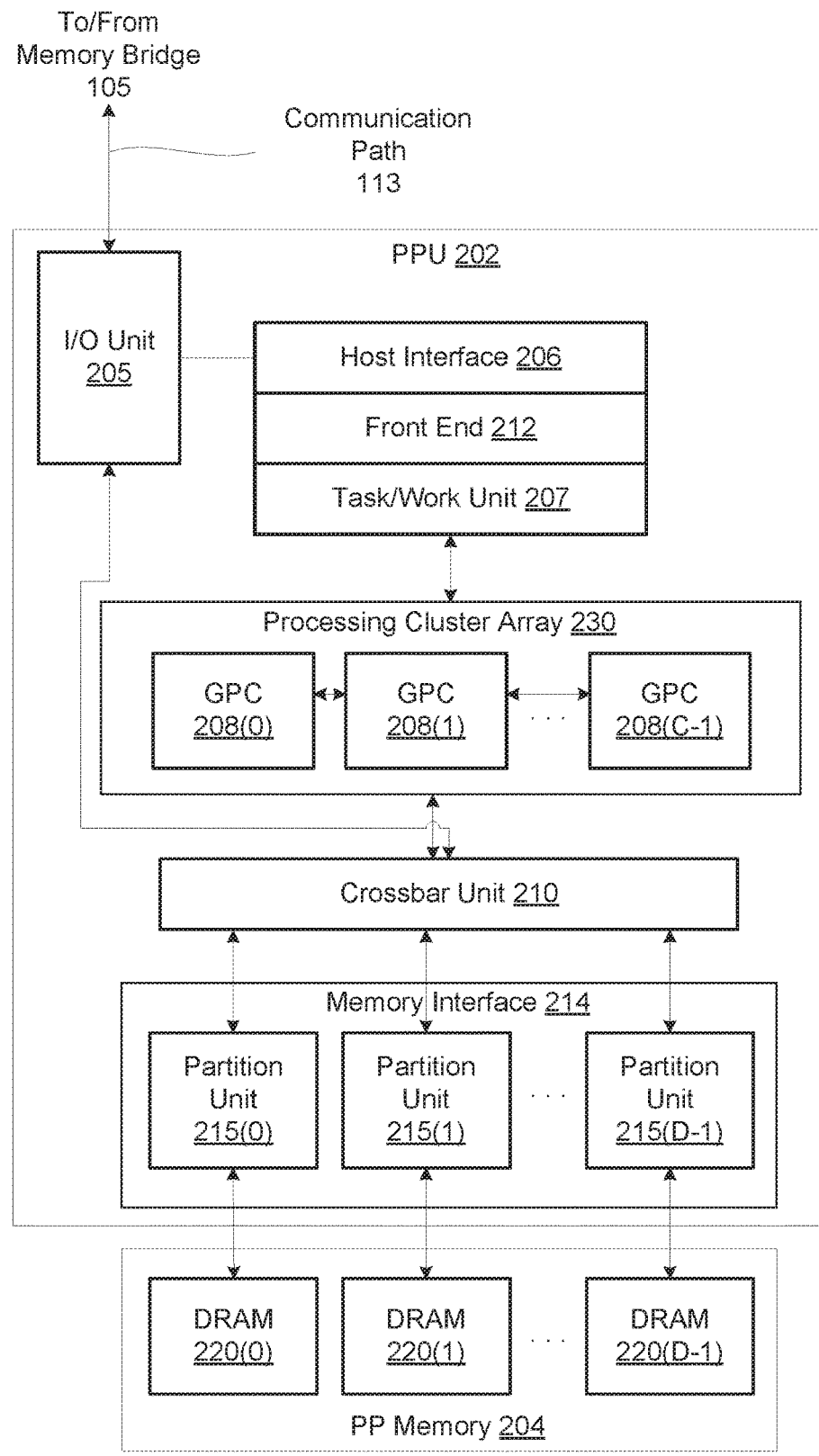
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
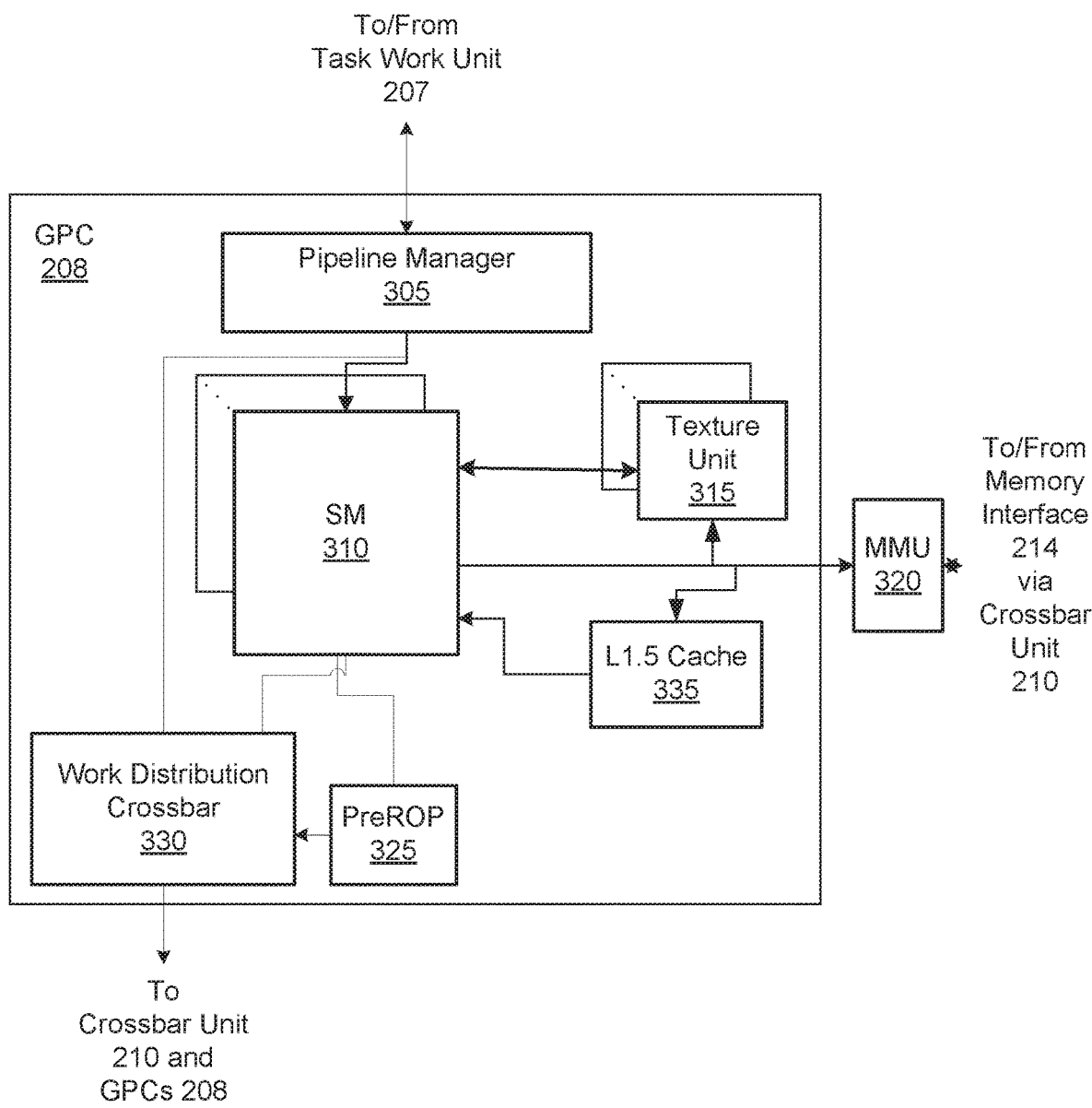
FIG. 3 is a block diagram of a general processing cluster included in the parallel processing unit of FIG. 2, according to various embodiments of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Figure 4:
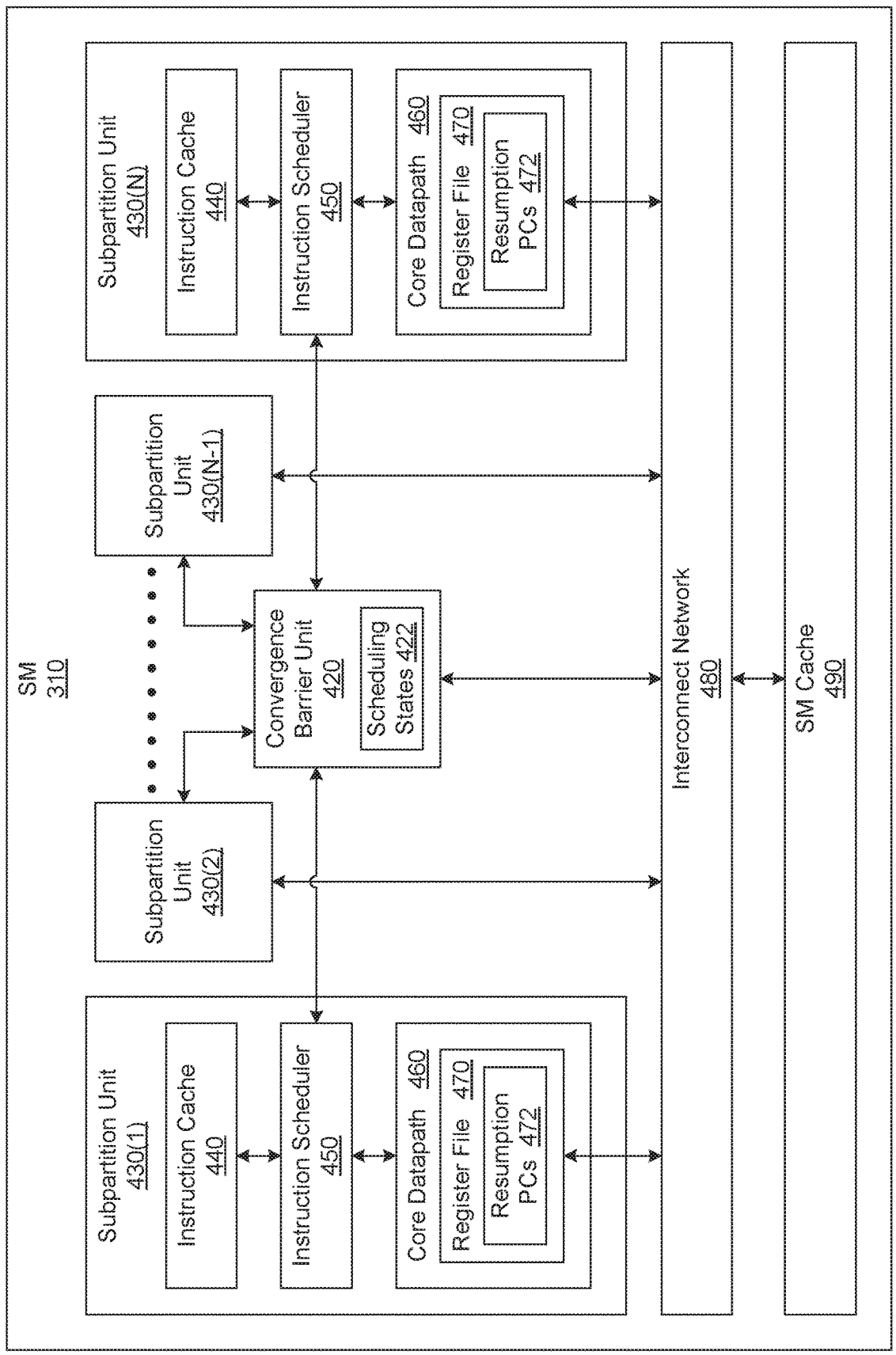
FIG. 4 is a block diagram of a streaming multiprocessor included in the general processing cluster of FIG. 3, according to various embodiments of the present invention.

FIG. 4 is a block diagram of a streaming multiprocessor (SM) 310 included in the general processing cluster (GPC) 208 of FIG. 3, according to various embodiments of the present invention. As shown, the SM 310 includes, without limitation, any number of subpartition units 430, an interconnect network 480, an SM cache 490, and a convergence barrier unit (CBU) 420.

As shown, the subpartition units 430 and the CBU 420 are connected to the SM cache 490 via the interconnect network 480. In various embodiments, the interconnect network 480 may be configured to enable the subpartition units 430 and the CBU 420 to access information included in any number and type of registers as well as memory locations included in the SM cache 490. The SM cache 490 may comprise any type and amount of on-chip memory. For instance, in various embodiments, the SM cache 490 may comprise shared memory, L1 cache memory, or a combination thereof.

In general, each of the subpartition units 430 may be assigned any number of warps, however a given warp is assigned to only one subpartition unit 430. As shown, each of the subpartition units 430 includes, without limitation, an instruction cache 440, an instruction scheduler 450, and a core datapath 460. As described in conjunction with FIG. 3, the SM 310 receives processing tasks from the pipeline manager 305. For each warp, the assigned subpartition unit 430 receives the assigned processing tasks and stores the associated instructions in the instruction cache 440. The instruction scheduler 450 issues instructions for various threads included in the assigned warps.

The core datapath 460 includes, without limitation, functional units (not shown) and a register file 407. The functional units perform any number and type of operations to execute threads assigned to the associated subpartition unit 430. The register file 407 provides a set of registers that may be implemented and arranged in any technically feasible fashion. For example, the register file 407 could be divided between the different warps assigned to the subpartition unit 430.

As is well known, developers may write code that, when executing on the SM 310, causes only a portion of the threads in a warp to execute an instruction. The threads in the warp are referred to herein as "diverged" during the execution of this type of instruction. To support diverged threads, for each warp, the instruction scheduler 450 issues instructions for "active" threads included in the warp via an associated warp program counter (PC). By contrast, the instruction scheduler 450 does not issue instructions for "inactive" threads included in the warp and, consequently the inactive threads are suspended.

The CBU 420 manages diverged threads and performs synchronization operations. For each thread included in each warp assigned to the SM 310, the CBU 420 maintains a scheduling state 422. As shown, the scheduling states 422 are stored the CBU 420. In alternate embodiments, the scheduling states 422 may be stored in any memory or cache that is accessible to the CBU 420 and the instruction schedulers 450. Each of the scheduling states 422 may include any number and type of values.

For a given thread, the associated scheduling state 422 specifies whether the thread is exited, blocked, or unblocked. If the associated scheduling states 422 is exited, then the thread is no longer capable of executing any instructions. If the associated scheduling state 422 is blocked, then the thread is at a synchronization operation and is inactive. If the associated scheduling state 422 is unblocked, then the thread may or may not be at a synchronization operation and may or may not be active. In alternate embodiments, the scheduling state 422 may include any number and type of states, where at least one of the states specifies that the thread is blocked.

To ensure forward progress for all non-exited threads included in a warp, the CBU 420 activates and deactivates various threads included in the warp based on one or more scheduling policies. As part of deactivating a thread, the CBU 420 sets a resumption program counter 472 that is associated with the thread to specify the instruction that the thread is to execute when reactivated. The CBU 420 stores the resumption program counters 472 in a register file 407 that is included in the core data path 460. In alternate embodiments, each of the resumption program counters 472 may be stored in any memory or cache that is accessible to the CBU 420 and the associated instruction scheduler 450.

In particular, when there are no active threads included in the warp, the CBU 420 executes an "election process" that activates one or more threads based on one or more scheduling policies, the scheduling states 422, and the resumption program counters 472. As part of the election process, the CBU 420 selects an inactive thread included in the warp for execution based on the scheduling policies. The CBU 420 then sets the warp PC associated with the warp equal to the resumption PC 422 associated with the selected inactive thread. Subsequently, the CBU 442 selects any other inactive threads included in the warp that are associated with resumption PCs 442 that are equal to the warp PC. For each of the selected threads, if the scheduling state 442 is blocked, then the CBU 420 sets the scheduling state 442 to unblocked. Finally, the CBU 420 activates the selected threads.

One limitation of conventional PPUs that support divergent threads is that the proper behavior of some instructions presupposes that the threads in each warp are converged. When the threads are, in fact, diverged, then the results are unpredictable. For instance, the code that is executing on the conventional PPU may produce incorrect results or terminate unexpectedly. Although some conventional compilers and conventional PPUs implement some level of synchronization functionality, that functionality is limited and does not guarantee convergence for all situations. As a general matter, the implementation of certain instructions may require a level of convergence across the different threads in a warp that cannot be maintained by conventional compiler and conventional hardware mechanisms included in conventional PPUs that are normally tasked with ensuring such thread convergence.

Intra-Warp Synchronization

To comprehensively and effectively ensure proper execution of code and instructions involving divergent threads, the SM 310 performs intra-warp synchronization operations based on a synchronization instruction. The synchronization instruction is also referred to herein as a "WARPSYNC" instruction. Each of the threads that participates in a WARPSYNC instruction individually specifies a "required" set of threads that are to be converged prior to executing the instruction immediately following the WARPSYNC instruction. As referred to herein, a "set of threads" includes between two threads and N threads, inclusive, where the warp includes N threads. Further, each of the threads that participates in the WARPSYNC instruction includes itself in the required set of threads. Each of the required set of threads may be specified as register, an immediate, or a constant.

Upon determining that a thread has reached a WARPSYNC instruction, the instruction scheduler 450 determines whether the WARPSYNC instruction is a candidate for optimization. As referred to herein, a WARPSYNC instruction is a candidate for optimization when each non-exited thread included in a warp participates in the WARPSYNC instruction, each non-exited thread specifies the required set of threads as an immediate or constant, and each non-exited thread is active. If the WARPSYNC instruction is a candidate for optimization, then the instruction scheduler 450 sets the associated warp PC to specify the instruction following the WARPSYNC instruction. In this fashion, the instruction scheduler 450 resolves the WARPSYNC instruction in one cycle.

If, however, the WARPSYNC instruction is not a candidate for optimization, then the CBU 420 performs synchronization operations that ensure that the required set of threads execute the instruction following the WARPSYNC instruction together. Notably, the CBU 420 disregards any exited threads included in the required set of threads while executing the WARPSYNC instruction. Accordingly, as referred to herein, any exited threads included in the required set of threads are considered to have arrived the WARPSYNC instruction for the purpose of WARPSYNC resolution. Initially, the CBU 420 concurrently and independently processes each active thread that is executing the WARPSYNC instruction. For each active thread, the CBU 420 sets the associated resumption program counter 472 to specify the WARPSYNC instruction. The resumption program counter 472 does not impact the current execution of the active thread. The CBU 420 then determines the required set of threads associated with the active thread. If the required set of threads does not include the active thread, then the CBU 420 issues an error message and allows the thread to continue executing.

Subsequently, the CBU 420 performs comparison operations to determine whether any of the threads included in the required set of threads are inactive. If any of the threads included in the required set of threads are inactive, then the CBU 420 sets the scheduling state 422 associated with the active thread to blocked and deactivates the active thread. Because the associated resumption program counter 472 specifies the WARPSYNC instruction, the newly deactivated thread is blocked at the WARPSYNC instruction.

As a result of the comparison operations, either none of the threads included in the warp are active or all the threads included in the required set of threads are active. If none of the threads included in the warp are active, then the CBU 420 performs an election process that activates one or more threads based on a scheduling policy, the scheduling states 422, and the resumption program counters 472. If, however, all the threads included in the required set of threads are active, then the required set of threads are executing the WARPSYNC instruction together. Since the required set of threads are converged, the CBU 420 sets the warp PC to specify the instruction immediately following the WARPSYNC instruction. Advantageously, when each thread participating in the WARPSYNC instruction specifies the required set of threads as an immediate, the CBU 420 may resolve the WARPSYNC instruction in approximately twelve cycles.

Note that the techniques described herein are illustrative rather than restrictive, and may be altered without departing from the broader spirit and scope of the invention. Many modifications and variations on the functionality provided by the CBU 420, the instruction scheduler 450, the SM 310, and the WARPSYNC instruction will be apparent to those of ordinary skill in the art without departing from the scope and spirit of the described embodiments.

For instance, in alternate embodiments, the instruction scheduler 450 may execute any portion (including all) of the election process. Further, the CBU 420 and the instruction scheduler 450 may execute any other processes that implement any scheduling policies in any technically feasible fashion to ensure forward progress of threads. In various embodiments, the WARPSYNC instruction may be associated with a guard predicate and/or an input predicate.

The inventive concept described herein can be used to define different instruction pairs, where the second instruction in the pair depends on having proper convergence of two or more threads in a warp. Each "instruction pair" includes a WARPSYNC instruction associated with a required set of threads in a warp and a subsequent instruction that presupposes that the required set of threads in the warp are converged. In this fashion, the instruction pair ensures proper operation of the subsequent instruction. Examples of such instruction pairs include, without limitation, an inter-warp barrier (BAR_SYNC) instruction, a shuffle (SHFL_SYNC) instruction, and a voting (VOTE_SYNC) instruction, to name a few. The BAR_SYNC instruction synchronizes the threads in and between multiple warps. The SHFL_SYNC instruction enables direct register-to-register data exchange between the threads in a warp. The VOTE_SYNC instruction generates a single vote result based on data received from threads in a warp.

In some embodiments, the CBU 420 supports register divergence for the WARPSYNC instruction. The CBU 420 activates the threads included in one of the required set of threads and sets the resumption program counter 472 for the threads included in any other required sets of threads to the WARPSYNC instruction. The CBU 420 eventually schedules the threads included in each of the other required sets of threads as per the scheduling policies. In this fashion, the CBU 420 independently converges each of the required set of threads.

Synchronizing Different Threads Included within a Warp

Figure 5:
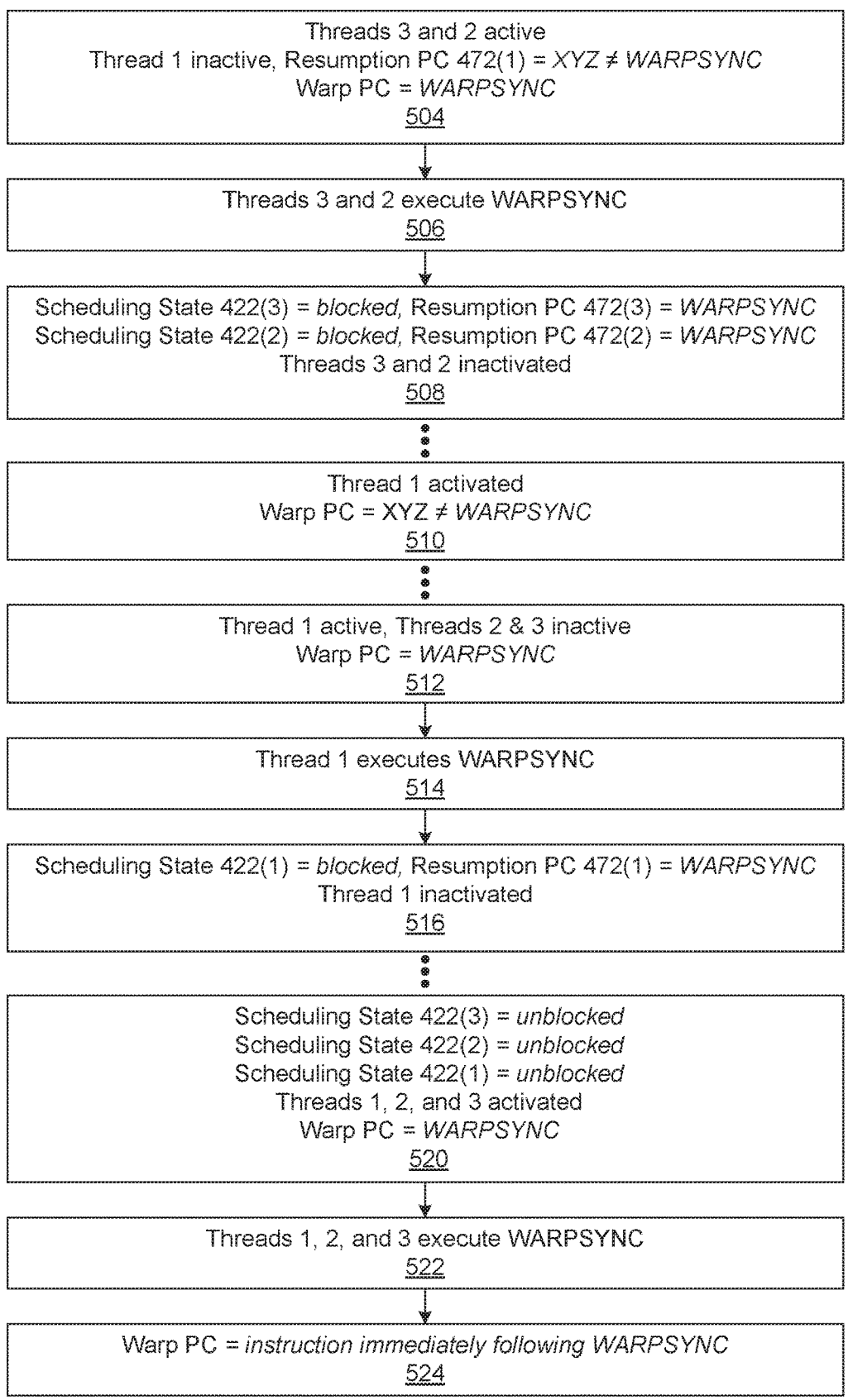
FIG. 5 is an example instruction sequence performed by the streaming multiprocessor of FIG. 4 to synchronize different threads included within a warp prior to concurrently executing a single subsequent instruction, according to various embodiments of the present invention.

FIG. 5 is an example instruction sequence performed by the streaming multiprocessor 310 of FIG. 4 to synchronize different threads included within a warp prior to concurrently executing a single subsequent instruction, according to various embodiments of the present invention. The context of FIG. 5 is that each of the threads 3, 2, and 1 specifies the required set of threads for a WARPSYNC instruction as the threads 3, 2, and 1.

An instruction sequence 500 begins at step 504, where threads 3 and 2 are active, thread 1 is inactive, the resumption PC 472(1) associated with thread 1 specifies an XYZ instruction that is not equal to the WARPSYNC instruction, and the warp PC specifies the WARPSYNC instruction. At step 506, the threads 3 and 2 execute the WARPSYNC instruction. At step 508, because thread 1 is inactive, the CBU 420 sets the resumption PC 472(3) associated with thread 3 to specify the WARPSYNC instruction, sets the scheduling state 422(3) associated with thread 3 to blocked, and deactivates thread 3. Similarly, the CBU 420 sets the resumption PC 472(2) associated with thread 2 to specify the WARPSYNC instruction, sets the scheduling state 422(2) associated with thread 2 to blocked, and deactivates thread 2.

At step 510, eventually, as part of an election process, the CBU 420 sets the warp PC to specify the XYZ instruction and activates thread 1. At step 512, after the instruction scheduler 450 issues one or more instructions (including the XYZ instruction) for thread 1, thread 1 reaches the WARPSYNC instruction. At step 514, thread 1 executes the WARPSYNC instruction. At step 516, because threads 3 and 2 are inactive, the CBU 420 sets the resumption PC 472(1) associated with thread 1 to specify the WARPSYNC instruction, sets the scheduling state 422(1) associated with thread 1 to blocked, and deactivates thread 1.

At step 520, eventually, as part of an election process, the CBU 420 sets the warp PC to specify the WARPSYNC instruction, sets the scheduling states 422(3), 422(2), and 422(1) to unblocked, and activates threads 1, 2, and 3. At step 522, threads 1, 2, and 3 execute the WARPSYNC instruction concurrently. At step 524, because threads 1, 2, and 3 are all active, the CBU 420 sets the warp PC to specify the instruction immediately following the WARPSYNC instruction. In this fashion, the CBU 420 allows the converged and active threads 1, 2, and 3 to proceed past the WARPSYNC instruction.

Figure 6:
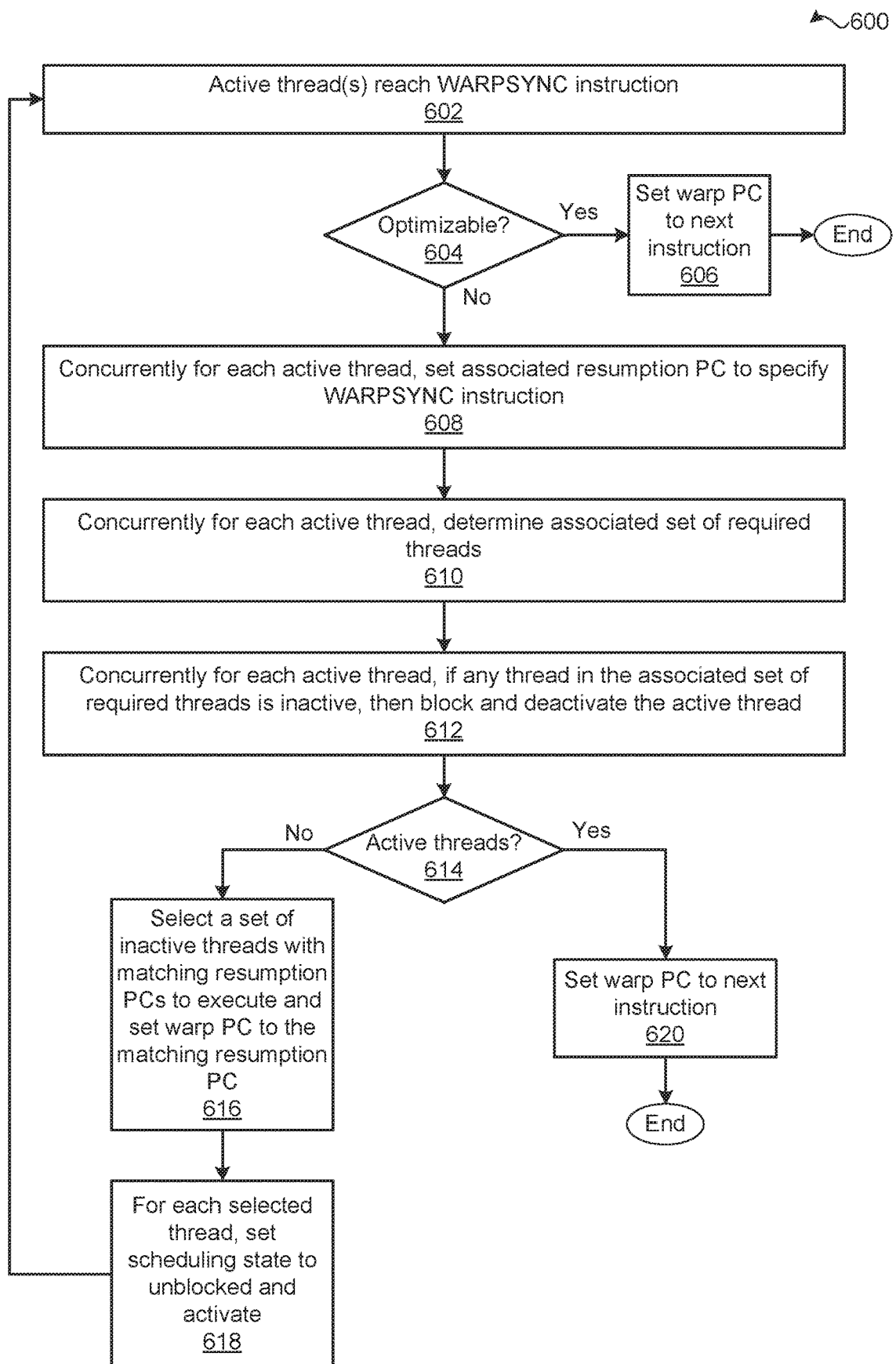
FIG. 6 is a flow diagram of method steps for synchronizing different threads included within a warp prior to concurrently executing a single subsequent instruction, according to various embodiments of the present invention.

FIG. 6 is a flow diagram of method steps for synchronizing different threads included within a warp prior to concurrently executing a single subsequent instruction, according to various embodiments of the present invention. Although the method steps are described in conjunction with the systems of FIGS. 1-4, persons skilled in the art will understand that any system configured to perform the method steps, in any order, falls within the scope of the present invention. For explanatory purposes only, FIG. 6 is described in the context of a single warp. Thus, the "active threads" referenced in the description are the active threads included in that single warp. Confining the description of FIG. 6 to the context of a single warp is not meant to limit the scope of the present invention in any way.

As shown, a method 600 begins at step 602, where one or more active threads reach a WARPSYNC instruction. At step 604, the instruction scheduler 450 determines whether the WARPSYNC instruction is a candidate for optimization. As described previous herein, a WARPSYNC instruction is a candidate for optimization when each non-exited thread participates in the WARPSYNC instruction, each non-exited thread specifies the required set of threads as an immediate or constant, and each non-exited thread is active.

If, at step 604, the instruction scheduler 450 determines that the WARPSYNC instruction is a candidate for optimization, then the method 600 proceeds to step 606. At step 606, the instruction scheduler 450 sets the warp PC to the instruction immediately following the WARPSYNC instruction, and the method 600 terminates.

If, however, at step 604, the instruction scheduler 450 determines that the WARPSYNC instruction is not a candidate for optimization, then the method 600 proceeds directly to step 608. At step 608, concurrently and for each active thread, the CBU 420 sets the associated resumption program counter 472 to specify the WARPSYNC instruction. At step 610, concurrently and for each active thread, the CBU 420 determines the required set of threads associated with the active thread. As part of step 610, if the CBU 420 determines that the required set of threads associated with a given active thread does not include the active thread, then the CBU 420 issues an error message and allows the thread to continue executing.

At step 612, concurrently and for each active thread, if any thread in the associated required set of threads is inactive, the CBU 420 deactivates and blocks the active thread. To block an active thread, the CBU 420 sets the scheduling state 422 associated with the active thread to blocked. Because the resumption PCs 472 associated with the active threads specify the WARPSYNC instruction, any newly deactivated thread is blocked at the WARPSYNC instruction. As a result of step 612, either none of the threads are active or all the threads included in the required set of threads are active.

If, at step 614, none of the threads are active, then the method 600 proceeds to step 616. At step 616, the CBU 420 performs an election process that selects one or more inactive threads to execute. Notably, for each of the selected threads, the resumption PC 472 specifies the same instruction and, as part of step 616, the CBU 420 sets the warp PC equal to the specified instruction. At step 618, for each of the selected threads, the CBU 420 sets the associated scheduling state 422 to unblocked and activates the thread. The method 600 then returns to step 602, where one or more active threads eventually reach and execute the WARPSYNC instruction.

If, however, at step 614, the threads included in the required set of threads are active, then the method 600 proceeds directly to step 620. At step 620, the CBU 420 sets the warp PC to the instruction immediately following the WARPSYNC instruction, and the method 600 terminates.

In sum, a warp synchronization (WARPSYNC) instruction configures a streaming microprocessor to converge a set of threads that are included in a warp. Upon executing the WARPSYNC instruction, for each active thread, a convergence barrier unit (CBU) sets an associated resumption program counter (PC) equal to the WARPSYNC instruction. Concurrently and for each active thread, the CBU performs comparison operations to determine whether any of the threads in the required set of threads are inactive. If any of the threads in the required set of threads are inactive, then the CBU blocks and deactivates the active thread. Because of the resumption PC, the newly deactivated thread is blocked at the WARPSYNC instruction.

As a result of the comparison operations, either none of the threads included in the warp are active or all the threads included in the required set of threads are active. If none of the threads included in the warp are active, then the CBU performs an election operation that selects one or more inactive threads, where the resumption PC associated with each of the selected inactive threads specifies the same instruction. The CBU sets the warp PC equal to the specified instruction, unblocks any of the selected threads that are blocked, and activates the selected threads. If, however, all the threads included in the required set of threads are active, then the required set of threads are executing the WARPSYNC instruction together. Since the required set of threads are converged, the CBU sets the warp program counter to the instruction immediately following the WARPSYNC instruction.

Advantageously, the disclosed techniques enable a PPU to properly execute code and instructions that rely on the convergence of different threads included within a warp. By contrast, conventional compiler and conventional hardware mechanisms included in conventional PPUs that are normally tasked with ensuring such thread convergence are unable to guarantee the thread convergence. Because conventional compilers and conventional PPUs are not always able to ensure that threads within a warp are converged when required for proper execution of code, code that is executing on a conventional PPU may produce incorrect results or terminate unexpectedly.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for synchronizing a plurality of threads, the method comprising:
   determining that a first thread included in a thread group has arrived at a synchronization instruction, wherein the first thread specifies a plurality of threads in the thread group that is to be synchronized in response to the synchronization instruction;
   for each thread in the plurality of threads, specifying the synchronization instruction as a next instruction for the thread to execute;
   determining that all threads included in the plurality of threads have arrived at the synchronization instruction; and
   causing all the threads included in the plurality of threads to execute a first instruction subsequent to the synchronization instruction.

2. The computer-implemented method of claim 1, wherein, for a given thread in the plurality of threads, specifying the synchronization instruction as the next instruction comprises setting a resumption program counter associated with the given thread to specify the synchronization instruction.

3. The computer-implemented method of claim 1, wherein, for each thread in the plurality of threads, specifying the synchronization instruction as the next instruction comprises setting a program counter associated with the thread group to specify the synchronization instruction.

4. The computer-implemented method of claim 1, further comprising, prior to determining that all the threads included in the plurality of threads have arrived at the synchronization instruction, for each thread in the plurality of threads that is not currently executing an instruction, setting a scheduling state associated with the thread to a blocked state until the thread advances to the synchronization instruction.

5. The computer-implemented method of claim 1, wherein causing all the threads included in the plurality of threads to execute the first subsequent instruction comprises, for each thread included in the plurality of threads, setting a scheduling state associated with the thread to a value that causes instructions to be issued to the thread.

6. The computer-implemented method of claim 1, wherein the synchronization instruction and the first instruction comprise an instruction pair.

7. The computer-implemented method of claim 1, wherein the first instruction comprises a shuffle instruction that enables direct register-to-register data exchange between the plurality of threads.

8. The computer-implemented method of claim 1, wherein the first instruction comprises a vote instruction that generates a single vote result based on data received from the plurality of threads.

9. The computer-implemented method of claim 1, wherein the first instruction comprises an inter-thread group barrier instruction that involves the plurality of threads and at least one other plurality of threads.

10. A system configured to synchronize a plurality of threads, the system comprising:
- an instruction cache that stores a plurality of instructions;
- an instruction scheduler coupled to the instruction cache; and
- a convergence barrier unit that is coupled to the instruction cache, wherein the convergence barrier unit:
  - determines that a first thread included in a thread group has arrived at a synchronization instruction, wherein the first thread specifies a plurality of threads in the thread group that is to be synchronized in response to the synchronization instruction;
  - for each thread in the plurality of threads, specifies the synchronization instruction as a next instruction for the thread to execute;
  - determines that all threads included in the plurality of threads have arrived at the synchronization instruction; and
  - causes all the threads included in the plurality of threads to execute a first instruction subsequent to the synchronization instruction.

11. The system of claim 10, wherein, for a given thread in the plurality of threads, specifying the synchronization instruction as the next instruction comprises setting a resumption program counter associated with the given thread to specify the synchronization instruction.

12. The system of claim 10, wherein, for each thread in the plurality of threads, specifying the synchronization instruction as the next instruction comprises setting a program counter associated with the thread group to specify the synchronization instruction.

13. The system of claim 10, wherein the convergence barrier unit, prior to determining that all the threads included in the plurality of threads have arrived at the synchronization instruction, for each thread in the plurality of threads that is not currently executing an instruction, sets a scheduling state associated with the thread to a blocked state until the thread advances to the synchronization instruction.

14. The system of claim 10, wherein causing all the threads included in the plurality of threads to execute the first subsequent instruction comprises, for each thread included in the plurality of threads, setting a scheduling state associated with the thread to a value that causes instructions to be issued to the thread.

15. The system of claim 10, wherein the synchronization instruction and the first instruction comprise an instruction pair.

16. The system of claim 10, wherein the first instruction comprises a shuffle instruction that enables direct register-to-register data exchange between the plurality of threads.

17. The system of claim 10, wherein the first instruction comprises a vote instruction that generates a single vote result based on data received from the plurality of threads.

18. The system of claim 10, wherein the first instruction comprises an inter-thread group barrier instruction that involves the plurality of threads and at least one other plurality of threads.

19. One or more non-transitory computer-readable storage media including instructions that, when executed by one or more processors, cause the one or more processors to perform the steps of:
- determining that a first thread included in a thread group has arrived at a synchronization instruction, wherein the first thread specifies a plurality of threads in the thread group that is to be synchronized in response to the synchronization instruction;
- for each thread in the plurality of threads, specifying the synchronization instruction as a next instruction for the thread to execute;
- determining that all threads included in the plurality of threads have arrived at the synchronization instruction; and
- causing all the threads included in the plurality of threads to execute a first instruction subsequent to the synchronization instruction.

20. The non-transitory computer-readable storage media of claim 19, wherein the instructions further cause the processor to, prior to determining that all the threads included in the plurality of threads have arrived at the synchronization instruction, for each thread in the plurality of threads that is not currently executing an instruction, setting a scheduling state associated with the thread to a blocked state until the thread advances to the synchronization instruction.

* * * * *